United States Patent Office 2,896,262
Patented July 28, 1959

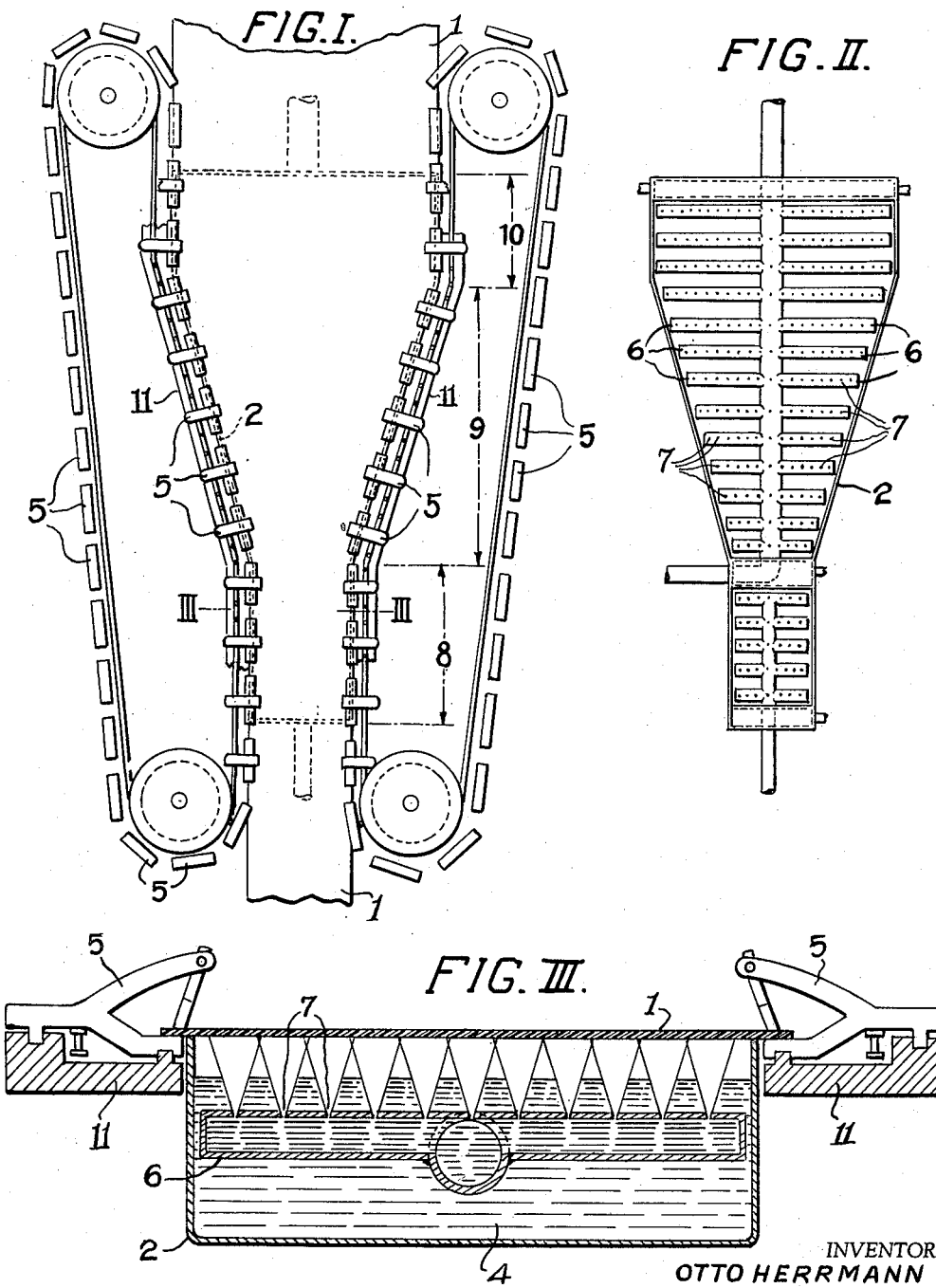
INVENTOR
OTTO HERRMANN

2,896,262

PROCESS FOR TRANSVERSELY STRETCHING A THERMOPLASTIC SHEET

Otto Herrmann, Wiesbaden, Germany, assignor to Kalle & Co. Aktiengesellschaft, Wiesbaden-Biebrich, Germany Application April 5, 1955, Serial No. 499,489

Claims priority, application Germany April 9, 1954

4 Claims. (Cl. 18—48)

The present invention relates to plastic foils and to a method of improving them. More particularly, the invention deals with a process for transverse stretching of thermoplastic foils.

Many of the known plastic foils can be considerably improved in their mechanical properties by transverse and/or longitudinal stretching. This is, for instance, the case with foils made of polyamide, polyurethanes, polyethylene and, above all, with foils of high polymeric polymethylene terephthalates, e.g. polyterephthalic acid glycolester.

For the transverse stretching of a continuous sheet of textile fabric, devices are used in which the sheet is continuously gripped at its edges by clamps, which thereafter move in a direction to advance the sheet in its longitudinal direction and at the same time to stretch it in its transverse direction until it has reached the desired width, and then release the edges of the sheet. However, if continuous sheets of plastic foils are to be stretched, the result of the stretching operation depends to a high degree on the conditions under which the stretching of the foil is performed, e.g. the most favorable temperature conditions should be kept while stretching the foil.

Now an improved method has been found for the transverse stretching of continuous thermoplastic foil sheets including the use of a gripping device which continuously grips the edges of the foil sheet, leads them outwards to stretch the continuous sheet transversely, and finally releases them, which method comprises the step of treating one side of the foil sheet, while it is being stretched and its edges are held by the gripping device, with hot liquids. Suitable agents for this treatment are hot water, or hot organic liquids containing water, such as hot dilute alcohol. As a rule, the course of the stretching may be further improved by allowing the hot liquids to act upon one side of the foil even before the stretching of the foil has begun.

A device designed for the performance of the process according to the present invention is described further down with reference to Figures 1 to 3. Of these, Fig. 1 shows the top view of a stretching device with a foil sheet spread thereover; Fig. 2 shows an important part of said device which part is hidden by the foil sheet in Fig. 1; Fig. 3 shows, on an enlarged scale, a cross-section through the device along the line indicated with III—III in Fig. 1.

The following part of the description deals with some particulars further illustrating the present invention.

The gripping devices for expanding the foil sheet may, e.g., resemble the clamps used in the broad-stretching machines for stretching textile fabrics. It is advantageous to protect the gripping devices and the foil edges held in them from the action of the hot liquids. This can be easily achieved when, as is the case with the present invention, the treating liquid affects only the underside of the foil. If the edges of the continuous foil sheet do not soften, high straining power can be applied without the foil edges slipping out of the tightly closed gripping devices, or being hurt by them even if they be provided with grooves.

The stretching operation itself is advantageously performed in the following way:

The continuous foil sheet 1 to be stretched is lead tightly over the open upper side of a gradually widening tank 2 which is provided with a horizontal brim 3 and filled with the hot treating liquid 4 almost to said brim. The clamps 5 which hold the edges of the foil sheet are conveyed along the brim of the tank 2 and follow its widening. This effects a transverse stretching of the foil. During this stretching operation the hot treating liquid washes up against the underside of the foil. This may, for instance, be effected by pressing the treating liquid through pipes 6 which at their upper side are provided with openings 7, thus causing the treating liquid to well against the foil. The liquid which drops off from the foil flows back into the tank. It leaves the tank by way of overflows, passes a temperature control to re-adjust it to the desired temperature, and is finally pressed again through the pipes 6 and the openings 7 and against the foil by means of a pump. The desired temperature compensation can also be attained by moving the treating liquid by way of agitation or pumping within the tank, but this method has proved less effective than re-heating outside of the tank. Suitably, the tank is sealed as tightly as possible by the foil sheet, thus preventing vapors from escaping.

Advantageously, the foil sheet to be stretched, while already clamped to the stretching frame or spreader, is first led with equidistant edges over the distance 8 and thereby heated to the desired temperature or softened to the desired degree, before entering section 9 of the stretching frame, where the clamp chains diverge. Analogously, it is of advantage not to take the foil from the gripping device immediately after the stretching process is finished, but to lead it with equidistant edges over another distance 10 as long as the foil is clamped to the stretching frame. The foil is thus cooled down before it is released from the gripping device and leaves the stretching frame. The foil sheet may thus be stretched to three times its original width, however, the expansion may also be greater or smaller.

In many cases, it has proved of advantage that with the process according to the present invention there is a favorable opportunity to impart to the foil sheet, while it is held by the gripping devices before, during or after the stretching procedure, several degrees of softness or plasticity, which are different from each other, and to accomplish the different degrees of plasticity quickly and evenly at the desired areas of the continuous foil sheet. For instance, the tank 2 may be divided into several partitions, each of which has a certain temperature. Thus it is possible to influence the stretching capability of the foil in the different stages of the stretching operation or in different areas, which may be of considerable advantage in certain cases.

As another advantage of the process according to the present invention the temperatures can be adjusted exactly to the prevailing requirements. For instance, the one-sided action of the treating liquid upon the foil allows for a much steadier temperature control than would be possible when dipping the foil into a treating bath during the stretching operation.

Moreover, the one-sided action of the treating liquid upon the under surface of the foil according to the present invention permits an additional treatment of the other side of the foil, or of parts thereof, with means which influence the stretching of the foil, such as for instance infra-red rays, cool air, or more or less effective insulation against heat loss. Such means serve for the fine adjustment of the stretching capability of the foil. Contrary to the main influence of the treating liquid, they shall exert only little influence. For instance, it is possible to insulate the marginal areas of the foil more effectively against heat loss than the center areas, thus counteracting the frequently occurring phenomenon that the center of the foil is more stretched than its borders.

The following examples are given to further illustrate the present invention, and are not intended as being limitative of the scope thereof.

Examples (1) According to the present invention the transverse stretching of a continuous polyethylene terephthalate foil is performed as follows: Starting material is a polyethylene terephthalate foil of 250μ thickness and 380 mm. width, which has been obtained by extruding the melt from a slot nozzle. On cooling the extruded melted film, care must be taken to keep the foil substantially amorphous. It is introduced into a stretching frame or spreader provided with clamps which has an inside measurement of 340 mm. at the entrance and a rate of feeding speed of 2 m. per minute. For the first 800 mm. the clamps are conveyed parallel to each other, which means the foil is not stretched in this section of the stretching device. During this time, water of 88° C. is washed against the underside of the foil. Subsequently, the clamps are led in diverging tracks for a distance of 2000 mm., the rate of divergence being 12°. In this section of the stretching device, where the actual transversal expansion of the foil is performed, the underside of the polyethylene terephthalate foil is washed against by water of 78° C. In spite of this relatively low temperature the foil stretches uniformly across its entire width. There follows a section where the clamps are again led parallel to each other for about 800 mm. Their inside measurement, between clamps, is now 1150 mm. This means that the polyethylene terephthalate foil has been expanded to 3.4 times its original width. During the last distance of 800 mm. the foil is no longer stretched and no more washed against, but is allowed to cool down a little until it is released from the clamps and leaves the stretching frame. After the transverse stretching the foil has a thickness of 72μ. If desired, it may subsequently be stretched lengthwise.

(2) By pouring a solution containing a mixed superpolyamide obtained by polycondensation of 4 parts by weight of caprolactam and 6 parts by weight of the adipic acid salt of diamino hexane, to which solution a softening agent has been added, a foil of 60μ thickness and 370 mm. width is obtained. The content of softening agent in the pouring solution is adjusted in such a way that the finished foil obtained from said solution contains 20% of softener. The foil is then stretched in the transverse direction by means of the stretching frame or spreader described in Example 1. The clamps are led for 800 mm. in equidistant tracks, subsequently for 2500 mm. in divergent tracks, and finally for another 800 mm. in equidistant tracks again. Feeding speed is 4 m. per minute.

In the introductory section of the device the inside measurement between clamps is 340 mm. As in Example 1, an inside measurement of 1150 mm. is reached after stretching. In the narrow introductory section, the one with the parallel tracks, the underside of the foil is washed against with water of 40° C. In the divergent section of the device, water of 65° C. is used for washing against one side of the foil.

The foil is evenly stretched across its entire width, but shrinks a little after leaving the stretching frame. The thickness of the foil after the stretching process is 26μ.

Having thus described the present invention, what I claim is:

1. A process for transversely stretching a thermoplastic sheet which comprises continuously moving said sheet in a horizontal planar path, impinging upwardly directed streams of hot liquid continuously against the under surface of the sheet as the sheet moves along said path to soften the sheet, and simultaneously stretching said sheet in a direction transverse to the path of movement of said sheet.

2. The process of claim 1 wherein the hot liquid is hot water.

3. The process of claim 1 wherein the thermoplastic sheet is polyethylene terephthalate.

4. The process of claim 1 in which before the stream impingement, stretching clamps are gripped against both side edges of the sheet, and the stream impingement is directed only at the portion of the sheet between the clamps, so as to keep the gripped edges from being softened as much as the remainder of the sheet.

References Cited in the file of this patent

UNITED STATES PATENTS

| | | |
|---|---|---|
| 2,176,153 | Semon | Oct. 17, 1939 |
| 2,412,187 | Wiley et al. | Dec. 3, 1946 |
| 2,582,165 | Rosenfeld | June 8, 1952 |
| 2,702,406 | Reed | Feb. 22, 1955 |